April 29, 1958     R. W. STINEMAN ET AL     2,832,896
ALTERNATOR OVERLOAD PROTECTION
Filed July 11, 1955

INVENTORS.
RUSSELL W. STINEMAN
ROBERT D. SIVERTS
BY
Reynolds, Beach & Christensen
ATTORNEYS

United States Patent Office 2,832,896
Patented Apr. 29, 1958

2,832,896

ALTERNATOR OVERLOAD PROTECTION

Russell W. Stineman and Robert D. Siverts, Seattle, Wash., assignors to Boeing Airplane Company, Seattle, Wash., a corporation of Delaware Application July 11, 1955, Serial No. 521,049

8 Claims. (Cl. 307—87)

This invention relates to an improved system for protecting electric power sources against sustained overload in a power distribution network employing paralleled power sources. A broad object hereof is such a protective system which operates reliably and in a manner least likely to deprive any load of energizing power in the event of a sustained overload on any individual power source. The invention is herein illustratively described in its preferred form by reference to its application to multiple alternator power systems used in airplanes; however, it will be recognized that the novel features comprising the inventive subject matter are applicable elsewhere and in other forms.

Another object of the invention is an electric power distribution system having a plurality of paralleled alternators, one or more of which may be reserved for operation only in the event of a failure of one or more of those alternators normally operating in the system, or in the event of sustained overloading of those normally operating alternators, said system including provisions for automatically protecting any alternators subjected to sustained overloading, without impairing the remainder of the system and with minimum possibility of interruption of service to any loads in the system. A related object is such a system capable of handling distributed overloads in the over-all system as well as overloads concentrated at a specific point, thereby enabling the system to handle overloads resulting from failure of a power source.

In the described protective system the alternators have individual load buses servicing certain loads connected thereto, and, as is now customary, these load buses are connected together through a paralleling bus. Usually a circuit breaker or interruptor is interposed between each alternator and its individual load bus for disconnecting the alternator from such load bus, hence from the entire system in the event of a sustained overload on the particular alternator. The present invention makes use of circuit breakers interposed between the individual alternators and their respective load buses as in the past, but controls the operation thereof on a different basis than that heretofore used. In accordance with the invention a paralleling circuit breaker is interposed in the paralleling bus and is controlled by alternator sustained overload to sectionalize the system first in the event of overloading of a particular alternator so that such alternator is not immediately relieved of all load but only of that portion thereof which it delivered through the paralleling bus connection. As a result the loads serviced by such alternator through its own load bus are not immediately deenergized, and in fact are not deenergized at all if the alternator thereafter is capable of supplying the necessary energy thereto without sustained overloading of the alternator windings. However, if the overload persists after the system is sectionalized by operation of the paralleling circuit breaker, then the individual alternator circuit breaker is operated to disconnect the alternator from its own load bus. Suitable alternator sustained overload sensing devices operated with differing time delays control the operation of the paralleling circuit breaker and of the individual alternator circuit breaker in the desired time sequence.

In one particular form of the improved system the paralleling bus is divided into two sections normally interconnected through a central circuit breaker. Such circuit breaker is arranged to be controlled by means sensitive to overloading of any of the system alternators, whereby in the event of sustained overloading of any alternator the system is sectionalized by disconnecting one part of the paralleling bus from the other part thereof. As an optional feature such a system may also incorporate paralleling circuit breakers which are operated next in the sequence should any of the alternators respectively associated therewith continue to carry a sustained overload, in which event the section of the system in which such alternator is connected is again subdivided by the paralleling circuit breaker so that the affected alternator is connected only to its own load bus. Further, if the overload persists thereafter, the affected alternator is then disconnected from its own load bus by operation of the individual alternator circuit breaker as the final step in the isolation of the overloaded alternator.

It should be kept in mind herein that overload protection is not directly the equivalent of fault protection, as overloads may occur which can ultimately destroy the power source yet go undetected by any conventional fault clearance apparatus responsive to current magnitude alone. Moreover it is important that the power source be permitted by the sustained overload protective apparatus to carry much more than its rated load for short time periods in order to satisfy system temporary and transient power requirements. It is characteristic of the present system accomplishing the named objectives that the paralleling circuit breaker or central circuit breaker, as the case may be, by which the system is sectionalized in response to sustained overload of an alternator is neither adjacent nor in series with the sustained overload sensing device controlling such circuit breaker, wherefore the system sections may continue to operate after sectionalization if the loads do not exceed rated values of the associated power sources thereafter. Moreover it will be noted that the novel system satisfactorily handles distributed overload of the entire system as well as overloads concentrated at a specific point.

These and other features, objects and advantages of the invention will become more fully evident from the following description thereof by reference to the accompanying drawings.

Figure 1:
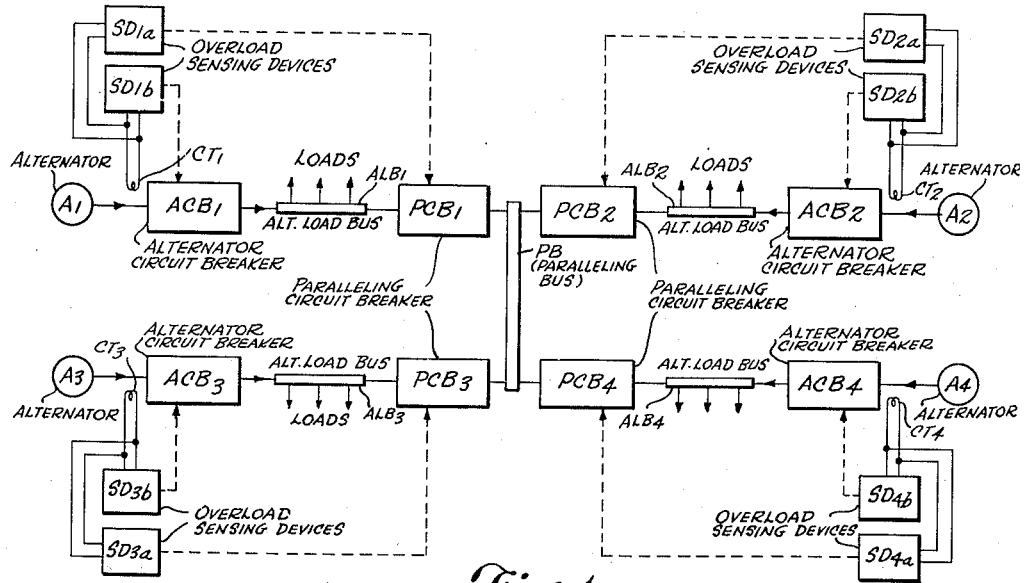
Figure 1 is a schematic diagram of the improved protective system in one form.

Referring to Figure 1, the power distribution system illustrated employs four alternators. However, the same principle applies to systems with two, three or a higher number of alternators having separate load buses and a tie bus connecting them together. The individual alternators A1, A2, A3 and A4 are connected through their respective alternator circuit breakers ACB1, ACB2, ACB3 and ACB4 to the associated alternator load buses ALB1, ALB2, ALB3 and ALB4, respectively. The individual load buses in turn are paralleled through the paralleling bus PB. The paralleling bus connections for the four alternators pass through paralleling circuit breakers PCB1, PCB2, PCB3 and PCB4, respectively, which are individually operable to disconnect any of the four alternators and their associated load buses from the remainder of the system.

Alternator A1 has two sustained overload sensing devices SD1a and SD1b. These devices may be of any suitable type capable of detecting predetermined sustained overloads, and in the example are illustrated as being energized by the coil of a current transformer CT1 which is inductively linked with one or all of the alternator output phase connections to energize the overload sensing devices in proportion to alternator loading. Sensing device SD1a is designed or adjusted to operate paralleling circuit breaker PCB1 in response to a predetermined sustained overloading of alternator A1, whereas sensing device SD1b is designed or adjusted to operate alternator circuit breaker ACB1 in response to a predetermined relatively greater sustained overloading of the alternator. It will be recognized that a sustained overload by definition includes the factors of degree of overload and the period of time during which such overload exists. Thus a predetermined sustained overload representing one value of overload current for a certain length of time may be equivalent to a smaller sustained overload current for a longer period of time, or to a larger overload current for a shorter period of time, depending upon the resultant heating effect produced by resistive losses in the alternator windings detrimental to the alternator insulation. The overload sensing device SD1a is designed in relation to the overload capacity of the alternator A1, so as to operate the paralleling circuit breaker PCB1 somewhat before it becomes ultimately necessary to disconnect the alternator from its load in order to prevent overheating and damage of the alternator. Overload sensing device SD1b is designed to operate the alternator circuit breaker ACB1 somewhat later, but still before the alternator can be damaged through overheating. The sustained overload sensing devices may operate on any well known or suitable basis for responding to the cumulative effect of overload current persisting for a predetermined period of time. Thermal delay relays of available types (not specifically illustrated) are a convenient choice for these devices.

Each of the other alternators has a similar set of overload sensing devices energized by current transformers CT and arranged to operate the paralleling and alternator circuit breakers, respectively, as illustrated. In each instance the subscript numerals applied to the sensing devices and current transformers correspond to those applied to the particular alternators.

In operation of the system shown in Figure 1, in an airplane installation, one practice is to operate only two of the four alternators at a time during normal load conditions. To that end, a practical system is so designed that two of the four alternators are capable of supplying the normal load requirements of the entire system through their own buses and the paralleling bus connections at substantially rated loading of such two alternators. The other two alternators thereby serve normally in a standby capacity. Such a practice is preferred to that of operating all the alternators at half rated load, because the operating efficiency of an alternator at rated load is much higher than it is at half rated load. Thus the total power loss of the system due to generator inefficiency is kept at a minimum.

Let it be assumed that alternators A1 and A2 are operating normally to deliver load current to the four alternator load buses ALB1, ALB2, ALB3 and ALB4, and that the alternators A3 and A4 are nonoperative. Under these conditions the alternator circuit breakers ACB3 and ACB4 will be open to prevent energy loss in the windings of alternators A3 and A4. It will be appreciated that the more vital or essential load elements to be supplied with electric power by the system are connected to the alternator load buses which correspond to the normally operating alternators and that the less important or essential load elements in the illustrative case will therefore be connected to the alternator load buses ALB3 and ALB4.

If under these conditions more load is added to one of the alternators in operation either by failure of the other operating alternator or by the connecting of additional load components to one or more of the alternator load buses, or by an internal fault in one of the load components causing it to draw abnormally high current and not yet sufficient current to blow its own fuse for removing it from the system, one of the two operating alternators, or both, may be overload. If alternator A1 is overloaded for a sufficient period of time, the overload sensing device SD1a operates the paralleling circuit breaker PCB1, which disconnects load bus ALB1 from the paralleling bus PB. This leaves alternator A2, if it has not failed, to supply the other three alternator load buses, and leaves the loads connected to alternator load bus ALB1 energized solely by alternator A1. If this operation relieves the overloading of alternator A1, then the loads connected to the associated load bus ALB1 continue to be suppplied with energy from alternator A1 alone, but if the overload persists to the danger point, then sensing device SD1b operates the alternator circuit breaker ACB1 to disconnect the bus ALB1 from the alternator A1. By suitable indicator means the operator is notified of the events that have occurred and in the meantime is starting up one or more of the other alternators A3 and A4 to provide additional power to the remainder of the system. The paralleling circuit breaker PCB1 may be reset manually by the operator to deliver power from the remainder of the system to load bus ALB1 in the event alternator circuit breaker ACB1 trips, or may be reset automatically by tripping of the latter circuit breaker, so that power is again restored to the alternator load bus ALB1, energizing important load components. In some cases the paralleling circuit breaker PCB2 and possibly the alternator circuit breaker ACB2 may be tripped after tripping of the circuit breakers PCB1 and possibly ACB1, before additional alternators may be started by the operator to supply the power supply deficiency in the system.

It will be recognized that, consistent with the basic requirement of alternator protection a maximum continuity of service of power for all of the load components in the system is achieved, particularly for the high priority loads, and that any interruption of service to any load bus will not be for a greater period than the time required for the operator to start up one or more of the additional alternators to supply a power deficiency. In addition to continuity of service accompanied by overload protection for the individual alternators, the novel system also provides a sort of standby fault protection arrangement which becomes operable ultimately in the event the normal fault clearance or protection apparatus fails to operate for any reason. Such a standby protective arrangement is highly desirable in military aircraft subject to battle damage.

Figure 3:
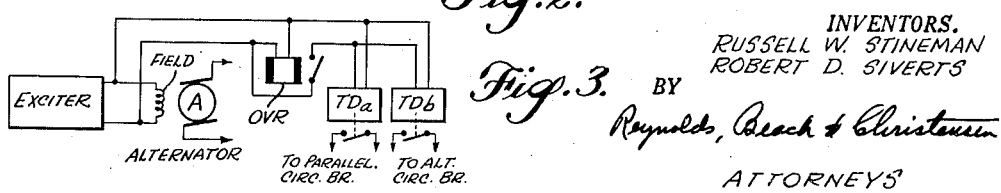
Figure 3 is a schematic diagram of an arrangement of devices for sensing alternator overload to operate the different circuit breakers associated with the affected alternator in the desired time sequence.

It will be recognized that different types of sustained overload sensing devices may be used to operate the paralleling circuit breakers and the individual alternator circuit breakers in the desired time sequence. In lieu of the arrangement shown in Figure 1 wherein the overload sensing devices are energized by current transformers, an alternative device is a voltage sensitive relay connected across the alternator field winding as shown in Figure 3, wherein such relay is designated OVR. Upon sensing an abnormally high field voltage this relay closes its contacts, which connects the thermal delay relays TDa and TDb across the field winding. If over-excitation of the alternator persists for a sufficient time, such as five seconds, the first thermal delay relay TDa operates and trips the paralleling circuit breaker. If the overload persists for a longer period of time, then the second thermal delay relay TDb operates the alternator circuit breaker. The two thermal delay relays are shown connected in parallel across the alternator field windings by closure of the contacts of relay OVR but it will be evident that the electrically heated thermal element (not shown) of relay TDb may be connected in series with the contacts of thermal delay relay TDa and thereby connected, by closure of the latter, across the alternator field windings if desired. These and other arrangements for sensing predetermined sustained overloadings of the alternators may be employed to a similar end.

Figure 2:
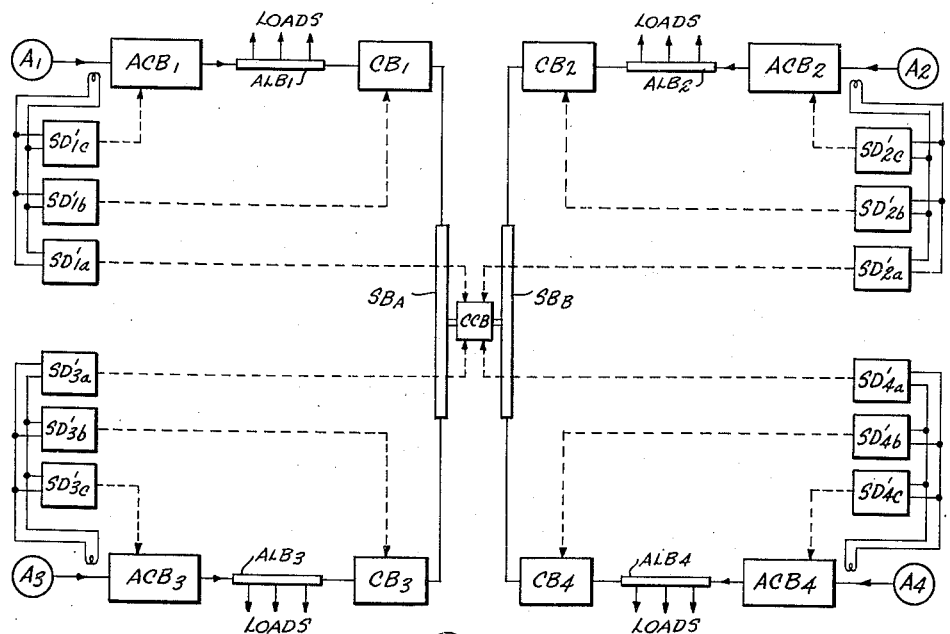
Figure 2 is a schematic diagram of the modified form of the protective system.

In the arrangement shown in Figure 2 the system is sectionalized in two successive steps instead of in one step as in Figure 1. In Figure 2 each of the four alternators is connected to its individual load bus through the alternator circuit breaker, and the load buses are interconnected through the paralleling circuit breakers CB1, CB2, CB3 and CB4, respectively, by a two-section paralleling bus. One section of the paralleling bus, SBA, is connected to the other section SBB through the central circuit breaker CCB, as shown. Alternators A1 and A3 are connected to the paralleling bus section SBA, whereas alternators A2 and A4 are connected to the paralleling bus section SBB. The alternator circuit breakers are arranged for operation by the individual alternator sustained overload sensing devices SD'1c, SD'2c, SD'3c and SD'4c, respectively, whereas paralleling circuit breakers CB1, etc., are similarly arranged for operation by the sustained overload sensing devices SD'1b, SD'2b, etc. In addition, there is associated with each alternator a third sustained overload sensing device (SD'1a, SD'2a, etc.), and all of these latter devices have operating connections to the central circuit breaker, so that if any one of the four alternators undergoes a sustained overload for a period exceeding the operating time of the sensing device SD'1a, SD'2a, SD'3a or SD'4a the central circuit breaker will be operated to selectionalize the system into two parts. The sensing devices SD'1a, SD'2a, etc. are designed or adjusted to operate upon a predetermined sustained overload of the associated alternators which is less than the predetermined sustained overload necessary to operate the sensing devices SD'1b, SD'2b, etc., whereas the latter are designed or adjusted to operate at a predetermined sustained overload which is less than that necessary to operate the sensing devices SD'1c, SD'2c, etc. Thus, the first step in the automatic operation of the system following the sustained overloading of one of the alternators is the tripping of the central circuit breaker CCB to sectionalize the system into two parts. If the sustained overload persists in any alternator thereafter, then at the proper later time the associated sensing device SD'1b, SD'2b, SD'3b or SD'4b will operate the associated paralleling circuit breaker CB1, CB2, CB3 or CB4 to further sectionalize that part of the system and separate the alternator and its load bus from the other alternator and its load bus. If thereafter the overload still persists, before the overloaded alternator is damaged, its associate circuit breaker ACB1, ACB2, ACB3 or ACB4 will be tripped by the related sensing device in the third step of the sequence.

The advantage of the arrangement shown in Figure 2, similar to that in Figure 1, is that a sustained overload on any alternator does not immediately remove power from all the loads in the system but rather divides the system into sections. If the source of overload is not in the immediate vicinity of a given alternator that alternator continues to supply load to its own bus, whereas the operator can start additional alternators in order to supply the resulting power deficiency of the remainder of the system, and eventually can restore the paralleled operation of the entire system by resetting the paralleling circuit breakers after the load demands of the system are met by a sufficient number of operating alternators without any such alternator being overloaded.

If desired the principle of selective system sectionalization on a sequential basis may be extended to more elaborate forms, in connection with which it will be recognized that loads may be dropped individually or in groups in response to alternator sustained overload. In all cases, however, the basic arrangement involving sequential operation of bus-tie breakers, or limiters, followed, directly or indirectly, by operation of individual alternator breaker or limiter operation is essential.

We claim as our invention:

1. In an electric power distribution system, the combination comprising a plurality of electric power sources, a plurality of individual load bus conductors respectively connected to said power sources for carrying current to loads connected to such conductors, circuit breaker means operatively interposed between each such load bus conductor and the power source connected thereto, each of said circuit breaker means including means selectively responsive to sustained overloading of the associated power source and operable to interrupt the load bus connection of such power source automatically in response to a predetermined sustained overload therein, paralleling bus conductor means interconnecting said individual load bus conductors, and paralleling circuit breaker means operatively interposed in said paralleling bus conductor means, said paralleling circuit breaker means including means selectively responsive to sustained overloading of one of said power sources and operable to interrupt the connection between said individual load bus conductors automatically in response to a predetermined sustained overload in any such power source less than said first-mentioned predetermined sustained overload of the same power source.

2. The combination defined in claim 1, wherein the paralleling circuit breaker means comprises a plurality of paralleling circuit breakers individual to the respective load bus conductors, the paralleling bus conductor means including common conductor means connecting together one side of all of said paralleling circuit breakers, with said paralleling circuit breakers operatively interposed between their respectively associated load bus conductors and said common conductor means.

3. The combination defined in claim 1, wherein there are at least four power sources and associated load bus conductors connected thereto, wherein the paralleling bus conductor means includes a first common conductor connected between the load bus conductors of two such power sources, a second common conductor connected between the load bus conductors of two other power sources, and wherein the paralleling circuit breaker means includes a central circuit breaker operatively interposed between said first and second common conductors normally to interconnect the same, said central circuit breaker being thereby operable to interrupt the connection between the first and second pairs of load bus conductors automatically in response to the second-mentioned predetermined sustained overload in any of said power sources.

4. In an electric power distribution system, the combination comprising a plurality of alternators, a plurality of individual load bus conductors respectively connected to said alternators to be energized thereby, circuit breakers operatively interposed respectively between each such load bus conductor and the associated alternator, each of said circuit breakers including means selectively responsive to sustained overloading of the associated alternator and operable to interrupt the load bus connection of such alternator automatically in response to a predetermined sustained overload therein, paralleling bus conductor means interconnecting said individual load bus conductors, and paralleling circuit breaker means operatively interposed in said paralleling bus conductor means, said paralleling circuit breaker means including means selectively responsive to sustained overloading of any of said alternators and operable to interrupt the connection between said individual load bus conductors automatically in response to a predetermined sustained overload in any such alternator less than said first-mentioned predetermined sustained overload of the same alternator.

5. An individual power supply protective arrangement in a power distribution system including a plurality of individual power supplies, a plurality of individual load buses respectively connected to said individual power supplies to be energized thereby, and a paralleling bus interconnecting said individual load buses, comprising in combination with said power supplies, load buses and a paralleling bus, a plurality of individual circuit interruptors operatively interposed between the respective power supplies and their associated load buses, each such circuit interruptor being arranged to respond to overloading of an individual power supply and being operable automatically in response to a predetermined sustained overloading of its associated power supply to interrupt the connection between such power supply and its individual load bus, and paralleling circuit interruptor means operatively interposed in said paralleling bus, said paralleling circuit interruptor means being arranged to respond to overloading in each such power supply and being operable automatically in response to a predetermined sustained overloading of any such power supply, less than the first-mentioned predetermined sustained overloading of the same power supply, to interrupt the paralleling connection between said load buses.

6. In combination, a plurality of power sources, a corresponding plurality of load buses respectively connected individually to said power sources, a paralleling bus interconnecting all of said load buses, a corresponding plurality of power-source sustained overload sensing means respectively arranged to be responsive to sustained overloading of said power sources, a corresponding plurality of circuit breakers respectively controlled by said sensing means and operatively interposed between said power sources and their associated load buses to interrupt the connection between any such power source and its load bus automatically in response to predetermined sustained overloading of such power source, said paralleling bus having a common central conductor means, and a corresponding plurality of paralleling circuit breakers respectively controlled by said sensing means operatively interposed in said paralleling bus between said common central conductor means and the respective load buses to interrupt the connection between said central conductor means and any such load bus in response to predetermined sustained overloading of the power source connected to such load bus less than the first-mentioned predetermined sustained overloading of the same power source.

7. In combination, four power sources, four load buses, respectively connected individually to said power source, paralleling bus means interconnecting said four load buses, four power-source sustained overload sensing means respectively arranged to be responsive to sustained overloading of said power sources, four circuit breakers respectively controlled by said sensing means and operatively interposed between said power sources and their associated load buses to interrupt the connection between any such power source and its load bus automatically in response to predetermined sustained overloading of such power source, said paralleling bus means having a first common conductor interconnecting two of said load buses, and a second common conductor interconnecting the other two load buses, a paralleling circuit breaker normally interconnecting said first and second common conductors, said paralleling circuit breaker being operable by any of said sensing means to disconnect said first and second common conductors automatically in response to predetermined sustained overloading of any power source less than the first-mentioned predetermined sustained overloading of the same power source.

8. In combination, at least two power sources, at least two load conductor means respectively connected individually to said power sources, a paralleling bus means interconnecting all of said load conductor means, at least two power-source sustained overload sensing means respectively arranged to be responsive to sustained overloading of said power sources, at least two circuit breakers respectively controlled by said sensing means and operatively interposed between said power sources and their respectively associated load conductor means to interrupt the connection between any such power source and its load conductor means automatically in response to predetermined sustained overloading of such power source, said paralleling conductor means having a common central conductor means, and at least two paralleling circuit breakers respectively controlled by said sensing means interposed in said paralleling conductor means between said common central conductor means and the respective load conductor means to interrupt the connection between said central conductor means and any such load conductor means in response to predetermined sustained overloading of the power source connected to such load conductor means less than the first-mentioned predetermined sustained overloading of the power source.

References Cited in the file of this patent
UNITED STATES PATENTS

| | | |
|---|---|---|
| 1,635,574 | Carey | July 12, 1927 |
| 1,646,215 | Place | Oct. 18, 1927 |
| 1,754,027 | MacLeod et al. | Apr. 8, 1930 |